(12) United States Patent
Ybarra et al.

(10) Patent No.: US 6,766,250 B2
(45) Date of Patent: Jul. 20, 2004

(54) SYSTEM AND METHOD FOR INHIBITING TRANSPONDER REPLIES

(75) Inventors: Kathryn W. Ybarra, Surprise, AZ (US); Cyro A. Stone, Peoria, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 68 days.

(21) Appl. No.: 10/177,919

(22) Filed: Jun. 21, 2002

(65) Prior Publication Data

US 2003/0236623 A1 Dec. 25, 2003

(51) Int. Cl.[7] ............................. G06F 17/00; B60T 8/00
(52) U.S. Cl. ..................... 701/301; 342/29; 342/357.08
(58) Field of Search ............................. 701/301, 1, 14; 342/29, 30, 36, 46, 455, 456, 357.08; 244/1 R

(56) References Cited

U.S. PATENT DOCUMENTS

| | | | | |
|---|---|---|---|---|
| 4,196,434 A | * | 4/1980 | Funatsu et al. | 342/32 |
| 5,075,694 A | * | 12/1991 | Donnangelo et al. | 342/455 |
| 5,506,590 A | * | 4/1996 | Minter | 342/462 |
| 5,521,817 A | * | 5/1996 | Burdoin et al. | 701/3 |
| 5,636,123 A | * | 6/1997 | Rich et al. | 701/207 |
| 6,483,453 B2 | * | 11/2002 | Oey et al. | 342/29 |

OTHER PUBLICATIONS

US 2002/0154061 A1—Frazier, Jr. et al—Oct. 24, 2002—close/intra–formation positioning collision avoidance system and method.*

* cited by examiner

Primary Examiner—Thomas G. Black
Assistant Examiner—Olga Hernandez
(74) Attorney, Agent, or Firm—William R. Bachand; Squire, Sanders & Dempsey L.L.P.

(57) ABSTRACT

A traffic collision avoidance system has a transponder with an interrogation monitoring engine for receiving interrogations and an interrogation response engine for inhibiting responses to the interrogations if the interrogations are air traffic control interrogations and the transponder is in a quiet mode. Typically the transponder enters quiet mode during military formation flight if the aircraft in which the transponder is installed is not a tail or lead member of the formation.

38 Claims, 4 Drawing Sheets

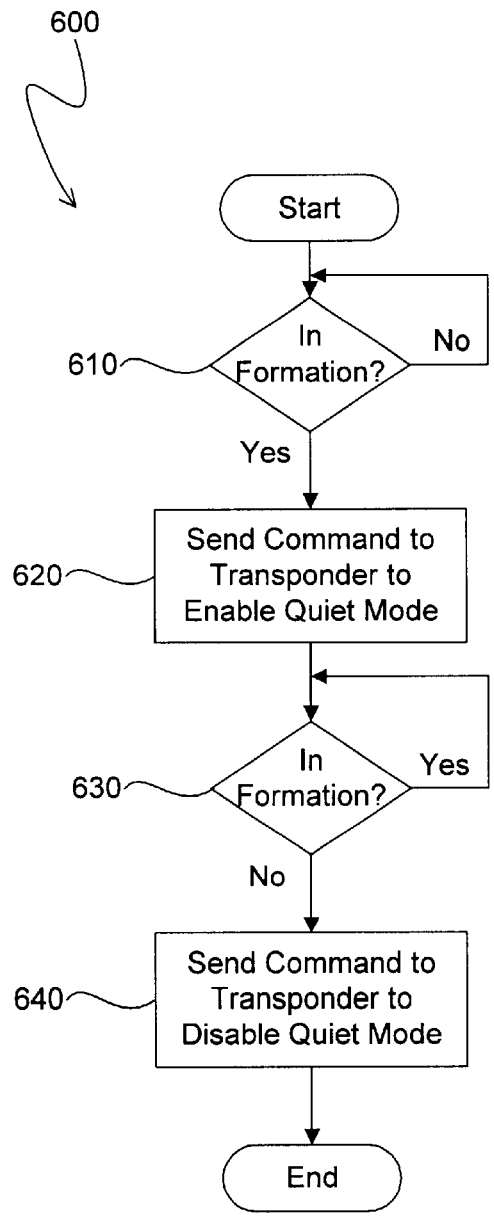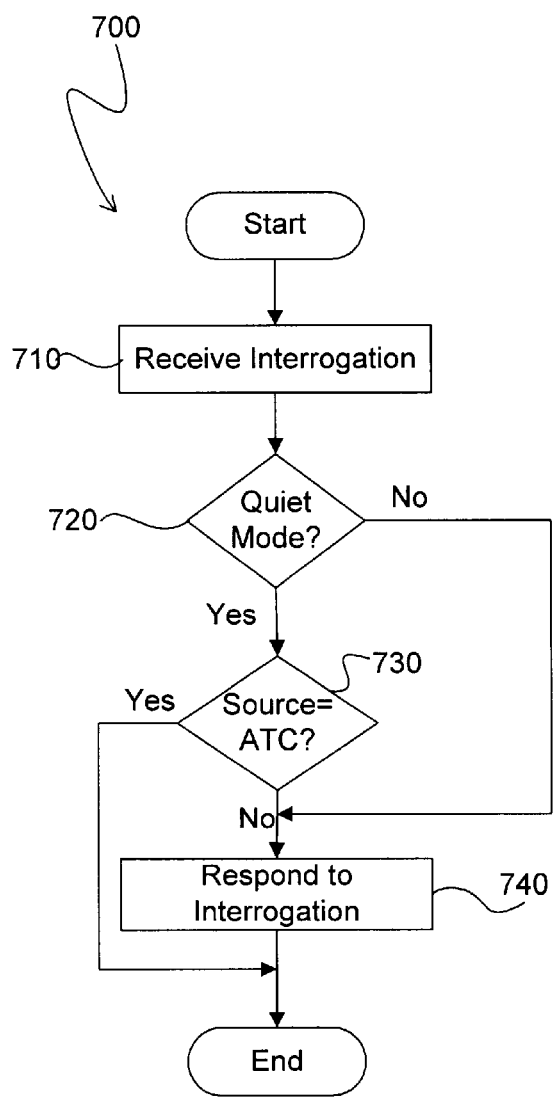
FIG. 6
FIG. 7

SYSTEM AND METHOD FOR INHIBITING TRANSPONDER REPLIES

FIELD OF THE INVENTION

Embodiments of the present invention relate to collision avoidance systems.

BACKGROUND OF THE INVENTION

In order to reduce the risk of midair collisions between aircraft, a system of the type known as a Traffic Alert and Collision Avoidance System (TCAS) equipment has been installed on many aircraft, such as commercial airline aircraft. In a conventional TCAS system, TCAS provides traffic advisories (TAs) and proximity warnings of nearby aircraft to flight crew, thereby assisting flight crew in seeing aircraft to avoid them. In addition, TCAS, specifically, TCAS II equipment, also provides resolution advisories (RAs), i.e., recommended escape maneuvers, to either increase or maintain vertical separation between aircraft traffic.

To generate TAs and RAs, TCAS equipment transmits radio frequency (RF) interrogation signals. The TCAS equipment then calculates slant range based on replies received from the transponders from other aircraft. Further, the replies may also include altitude information. From several successive replies, the TCAS equipment calculates a closure rate and then calculates a time to reach a closest point of approach (i.e., divide slant range by closure rate). Based on the calculated values, the TCAS equipment generates TAs and RAs to assist the flight crew in avoiding other aircraft.

When aircraft are flown in formation (e.g., military formation flights), the transponder and TCAS equipment, if so equipped, are generally placed in a standby mode so that the transponders do not respond to interrogation. Accordingly, TCAS equipment in aircraft that are not in the formation will not be able to detect aircraft in the formation flight. Likewise, aircraft that are in the formation flight will not be able to detect other aircraft whether or not these other aircraft are in the formation flight. Placing transponders into standby mode during large formation flights is desirable so as to reduce RF interference and to reduce Air Traffic Control (ATC) screen clutter due to a large number of aircraft transponders responding to ATC interrogations simultaneously.

Accordingly, a new system and method for inhibiting transponder replies to ATC interrogations during military formation flight while maintaining all other transponder and TCAS functions is needed.

SUMMARY OF THE INVENTION

A system, according to various aspects of the present invention, inhibits transponder replies to some types of interrogations during formation flight. In one embodiment of the invention, the system has a TCAS computer unit (CU) coupled to a transponder. The TCAS CU includes a flight formation detection engine that determines if the host aircraft is in a formation and if so, if the aircraft is not a tail or lead aircraft. If the host aircraft is a not a tail or lead aircraft in a formation flight, the engine also notifies the transponder to inhibit replies.

The transponder comprises an interrogation response engine that responds to all interrogations received. In addition, the response engine receives a command to inhibit replies (e.g., quiet mode command) that is sent by the detection engine. Upon receipt of such a command, the response engine will inhibit certain replies, for example, by responding to interrogations received from other aircraft and ignoring interrogations sent by ATC.

The present invention further provides a method for inhibiting transponder replies to some types of interrogations during formation flight while continuing other transponder functions. The method comprises: receiving an interrogation; classifying the interrogation according to flight formation status and type of interrogation; and responding to the interrogation in accordance with the classification.

Accordingly, by inhibiting transponder replies to ATC interrogations during formation flights and not inhibiting replies to TCAS interrogations, the system and method beneficially reduces ATC screen clutter while also reducing the risk of midair collisions between aircraft.

BRIEF DESCRIPTION OF THE DRAWING

Embodiments of the present invention will now be further described with reference to the drawing, wherein like designations denote like elements, and:

FIG. 5 is a memory contents diagram of a memory device of the transponder of FIG. 4;

FIG. 6 is a flowchart of a method for entering quiet mode according to various aspects of the present invention;

FIG. 7 is a flowchart of a method for inhibiting transmitting according to various aspects of the present invention.

DETAILED DESCRIPTION OF THE PREFERRED EMBODIMENTS

A system according to various embodiments of the present invention reducing the risk of midair collisions between aircraft with comparatively less radio communication than conventional systems. The system receives interrogations from other aircraft and from ATC and selectively transmits replies to interrogations and selectively transmits unsolicited messages. Selection of whether to transmit or not is based on message format: the format of the message received as an interrogation or the format of the message to be sent as an unsolicited message. Generally, during formation flight, the system will not reply to ATC interrogations, but will continue to respond to interrogations from other aircraft and transmit only predetermined types of unsolicited messages. Screen clutter for air traffic control is reduced.

Figure 1:
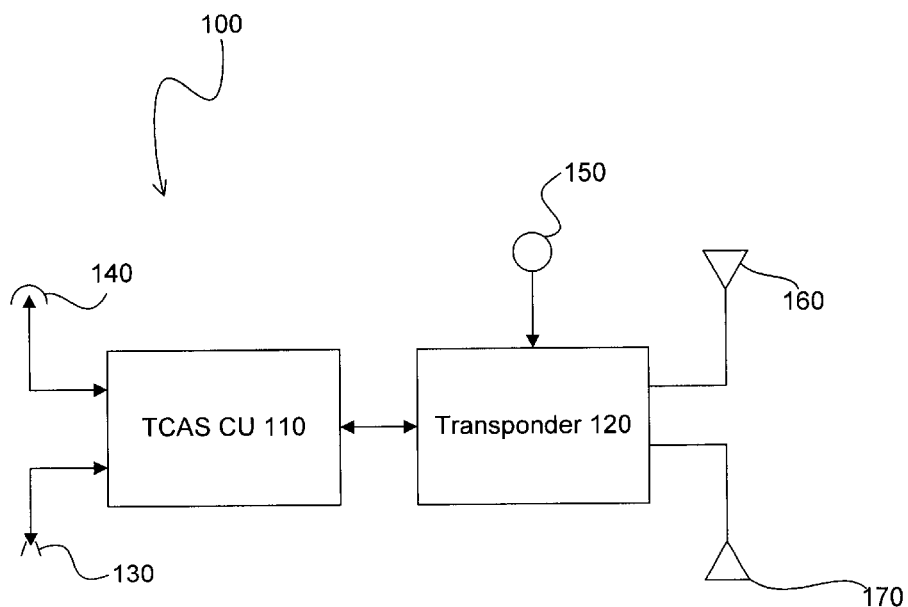
FIG. 1 is a functional block diagram of a system according to various aspects of the present invention.

For example, system 100 of FIG. 1 inhibits transponder replies to ATC interrogations during flight formations according to an embodiment of the invention. In other words, system 100 permits transponder replies only to interrogations having a permitted (as opposed to inhibitted) message format. System 100 includes a TCAS of the type described in DO-185A "Minimum Operational Performance Standards For Traffic Alert and Collision Avoidance System II (TCAS II) Airborne Equipment 1997" available from RTCA and Mira CD-ROM Publishing, incorporated herein by reference. The TCAS includes a computing unit CU 110 communicatively coupled to a transponder 120. In an embodiment of the invention, the transponder 120 includes a Mode S transponder of the type described in either RTCA/DO-181C for commercial aircraft or NATO/MAS STANAG 4193 for military aircraft. Communicatively coupled to the TCAS CU 110 are a top directional antenna 140 and a bottom omnidirectional antenna 130. Bottom antenna 130 may include a directional antenna. Communicatively coupled to the transponder 120 are an altimeter 150, a top antenna 160 and a bottom antenna 170.

TCAS CU 110 performs colision avoidance functions including, among other things, airspace surveillance, intruder tracking, aircraft altitude tracking, threat detection, RA maneuver determination and selection, advisory generation, and flight formation detection. Colision avoidance functions are performed in normal modes of operation and in a quiet mode of operation. TCAS CU 110 determines a suitable mode of operation and notifies transponder 120 of operation in a quiet mode. The TCAS CU 110 performs its tasks using pressure altitude, radar altitude, and transponder replies/responses from other aircraft to interrogations. TCAS CU 110 uses antennas 130 and 140 to transmit interrogations (e.g., at 1030 MHz) and to receive transponder replies to the interrogations (e.g., at 1090 MHz). In various normal modes of operation system 100 responds to interrogations and transmits unsolicited messages according to performace specifications discussed above. In a quiet mode of operation, system 100 does not (as it would in a normal mode) respond to particular interrogation message formats or transmit particular unsolicited message formats. TCAS CU 110 will be discussed in further detail in conjunction with FIG. 2 and FIG. 3.

Transponder 120 responds, via antennas 160 and 170, to interrogations received, also via antennas 160 and 170, from other aircraft as well as from ATC. The responses may include an aircraft identification number or flight ID assigned by ATC as well as pressure altitude from altimeter 150 if the transponder 120 is a mode S transponder. Transponder 120 enters and exits a quiet mode upon receipt of suitable commands from the TCAS CU 110, for example entering quiet mode during military formation flight. During quiet mode, transponder 120 only responds to interrogations received from other aircraft and ignores ATC interrogations. Transponder 120 transmits unsolicited messages (e.g., squitters). Transponder 120 will be discussed in further detail in conjunction with FIG. 4 and FIG. 5.

Figure 2:
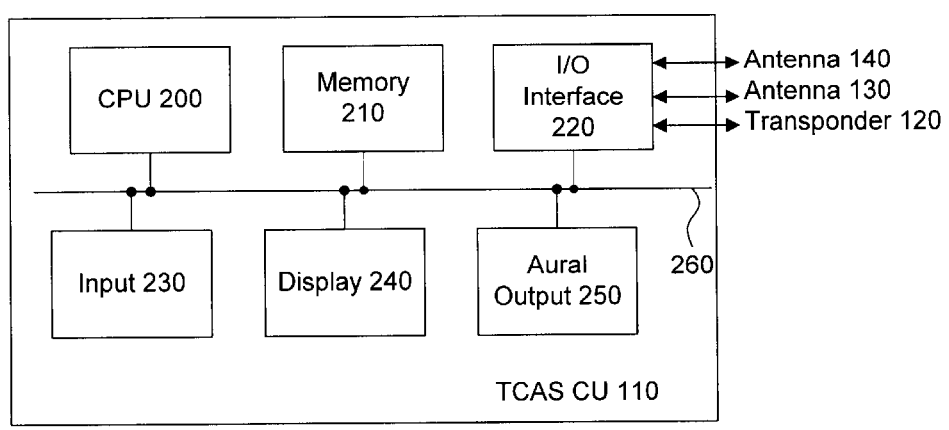
FIG. 2 is a functional block diagram of a TCAS computer unit (CU) of the system of FIG. 1.

FIG. 2 is a block diagram illustrating TCAS CU 110 of system 100 (FIG. 1). TCAS CU 110 comprises a central processing unit (CPU) 200, a memory device 210, an input/output (I/O) interface 220, an input device 230, a display 240, and an aural output device 250, all communicatively coupled together via a system bus 260. CPU 200 includes an Intel Pentium® microprocessor, Motorola Power PC® microprocessor or other processor for performing, among other things, processing of instructions stored in memory device 210. Memory device 210 includes a magnetic disk, Random-Access Memory (RAM), Read Only Memory (ROM) or other device or a combination of working and/or persistent memory devices. Memory 210 stores instructions for the operation of TCAS CU 110 and will be discussed in further detail in conjunction with FIG. 3.

I/O interface 230 enables communications with transponder 120 and with antennas 130, 140. Input 230 comprises a keyboard, keypad, mouse, or other device, or a plurality of input devices for entering data into TCAS CU 110 and/or to place TCAS CU 110 into different modes. Display 240 includes a cathode ray tube (CRT) monitor, liquid crystal display (LCD) monitor, or a combination of monitors for displaying traffic displays and RAs. Aural output 250 comprises speakers for issuing aural TAs and/or RAs.

Figure 3:
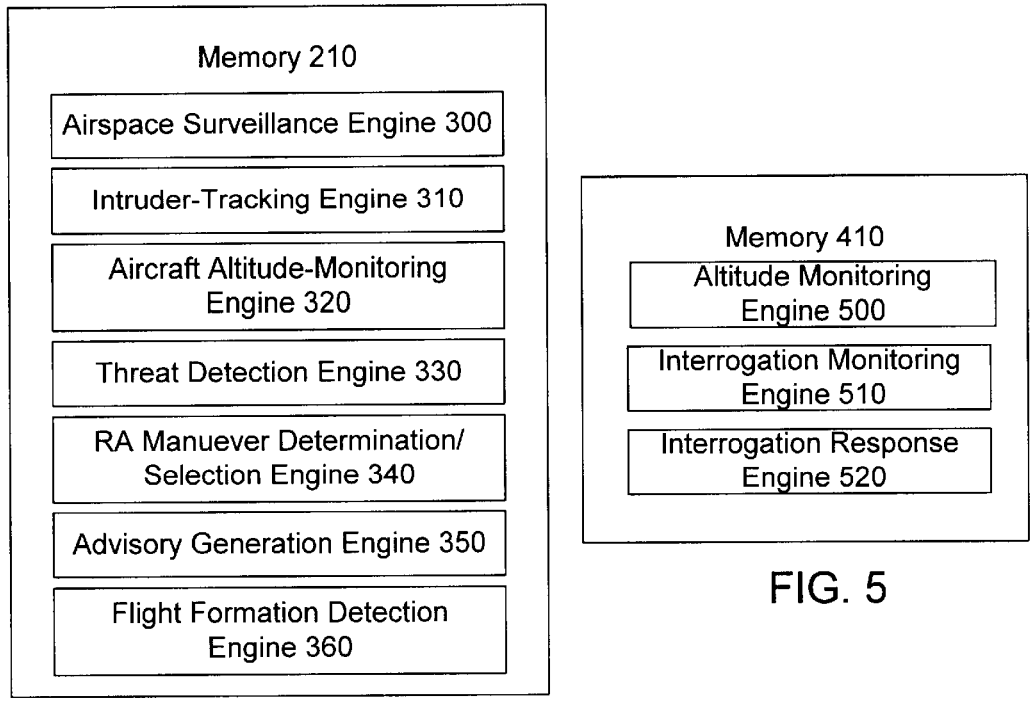
FIG. 3 is a memory contents diagram of a memory device of the TCAS CU of FIG. 2.

FIG. 3 is a block diagram illustrating contents of a memory device 210 of the TCAS CU 110 (FIG. 1). Memory device 210 comprises an airspace surveillance engine 300, an intruder-tracking engine 310, an aircraft altitude-monitoring engine 320, a threat detection engine 330, an RA maneuver determination/selection engine 340, an advisory generation engine 350, and a flight formation detection engine 360. Surveillance engine 300, independent of any ground inputs, performs surveillance of nearby aircraft by issuing interrogations at 1030 MHz via antennas 130 and 140 and receiving responses from aircraft at 1090 MHz via antennas 130 and 140.

Intruder-tracking engine 310 tracks aircraft identified by the surveillance engine 300. Aircraft altitude-monitoring engine 320 monitors altitude of the aircraft that the TCAS CU 110 is installed in by using radar altitude data and/or pressure altitude data from the transponder 120 and/or other sources. Threat detection engine 330 determines if tracked aircraft represent a threat based on altitude, range and velocity data for the tracked aircraft. RA maneuver determination/selection engine 340 determines maneuvers to avoid tracked aircraft that are threats and then selects one of the determined maneuvers. The advisory generation engine 350 then displays symbols representing the selected maneuver on display 240 and also issues an aural warning or message via aural output 250.

Flight formation detection engine 360 determines if the aircraft that the TCAS CU 110 is installed in (also called the host aircraft) is a member of a flight formation and not a tail member or lead member. If the engine 360 determines that the aircraft is in a flight formation and is not a tail member or a lead member, the engine 360 notifies transponder 120 to enter a quiet mode. In an embodiment of the invention, the engine 360 notifies transponder 120 to enter a quiet mode via information encoded in a periodic ARINC 429 data transmission. Engine 360 determines if the aircraft is in a flight formation and not a tail or lead member via flight crew input via input device 230. In an alternative embodiment of the invention, engine 360 makes this determination by monitoring RF transmissions from other aircraft in the formation. In another embodiment of the invention, engine 360 makes this determination by comparing an aircraft identifier (e.g., flight ID, Mode A Identity Code, Mode S address, military Mode 2 Code, or military Mode 5 identification) from transponder 120 with a set (not shown) of predefined aircraft identifiers for formation members stored in memory 210.

Figure 4:
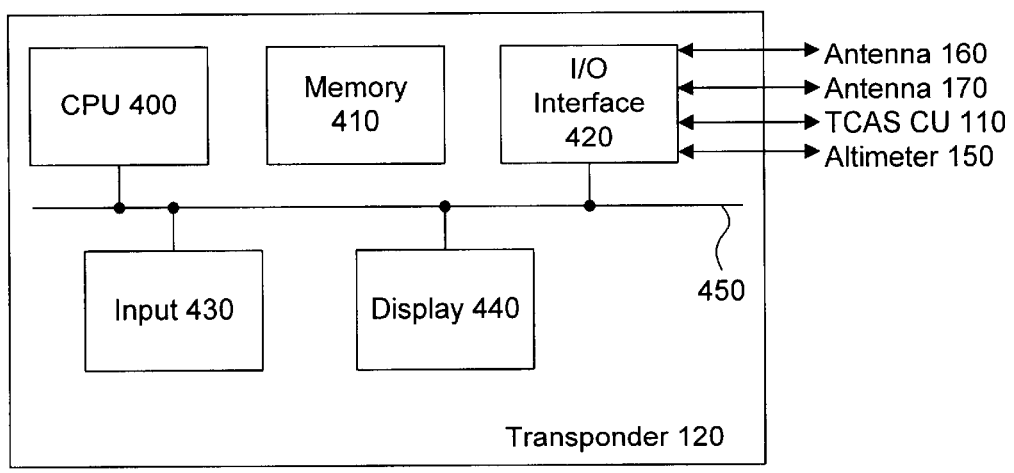
FIG. 4 is a functional block diagram illustrating a transponder of the system of FIG. 1.

FIG. 4 is a block diagram illustrating a transponder 120 of system 100 (FIG. 1). Transponder 120 comprises a central processing unit (CPU) 400, a memory device 410, an input/output (I/O) interface 420, an input device 430, and a display 440, all communicatively coupled together via a system bus 450. CPU 400 includes an Intel Pentium® microprocessor, Motorola Power PC® microprocessor or other processor capable to processes instructions stored in memory device 410. Memory device 410 includes a magnetic disk, Random-Access Memory (RAM), Read Only Memory (ROM) or other device or a combination of working and/or persistent memory devices. Memory 410 stores instructions for the operation of transponder 120 and will be discussed in further detail in conjunction with FIG. 5.

I/O interface 420 enables communications with TCAS CU 110 and with antennas 160, 170. Input 430 comprises a keyboard, keypad, mouse, or other device, or a plurality of input devices for entering data into transponder 120, such as aircraft ID or flight ID, and to place transponder 120 into different modes. Display 440 includes a cathode ray tube (CRT) monitor, liquid crystal display (LCD) monitor, or other device, or a combination of devices for displaying a flight ID.

FIG. 5 is a block diagram illustrating contents of a memory device 410 of transponder 120 (FIG. 4). Memory 410 comprises an altitude monitoring engine 500, an interrogation monitoring engine 510, and an interrogation response engine 520. Altitude monitoring engine 500 measures pressure altitude as received from altimeter 150. Interrogation monitoring engine 510 monitors interrogations received from ATC and other aircraft via antennas 160 and 170. Interrogation response engine 520 responds to interrogations via antennas 160 and 170. Responses typically include a flight ID and pressure altitude. Response engine 520 may also receive from computer unit 210 commands to control transmitting (e.g., enter or exit a quiet mode).

While in a quiet mode, the response engine 520 may inhibit transmission of replies to some message formats and continue to transmit messages of other message formats. In one implementation, no response is made to an interrogation when the interrogation message has a particular message format. For example, indicia of one or more message formats may be stored in memory 210 or 410 in a manner that implies or expresses that reply to such formats is to be inhibitted or transmission of such formats is to be inhibitted. For example, separate lists may be maintained for permitted and inhibitted message formats. When the indicia is implemented as an express flag, for example, the flag may be asserted (true, or false) for indicating inhibiting reply. Further, particular message formats that would otherwise be squittered (i.e., an unsolicited transmission) are not transmitted while in a quiet mode. Both of these types of inhibbiting transmission are described in Table 1.

In an alternate implementation, when a proper response to an interrogation would otherwise include an inhibitted message format the transponder in a quiet mode does not respond to that interrogation. Any message format may be designated as an inhibitted message format by software design, initialization, configuration, installation, or operator input, though operator input may not be appropriate without procedural safeguards in typical flight applications.

TABLE 1

| Messages that are Interrogations | | Unsolicited Messages | |
|---|---|---|---|
| Permitted Formats | Inhibitted Formats | Permitted Formats | Inhibitted Formats |
| Mode S UF=0; | ATCRBS Mode A; | Mode S DF=11; | Mode S DF=17; |
| Mode S UF=16; | ATCRBS Mode C; | | Mode S DF=19; |
| | Mode S UF=4; | | |
| | Mode S UF=5; | | |
| | Mode S UF=11; | | |
| | Mode S UF=20; | | |
| | Mode S UF=21; | | |

ATC interrogations (for which no response is made while in a quiet mode) include ATCRBS Mode A and Mode C interrogations, as well as Mode S UF=4, UF=5, UF=11, UF=20, and UF=21 interrogations. While in a quiet mode, the response engine 520 may respond to interrogations from other aircraft, such as Mode S UF=0 and UF=16 interrogations. The response engine 520 may continue to transmit unsolicited Mode S DF=11 replies (acquisition squitters). Response engine 520 may inhibit transmission of unsolicited Mode S replies while in a quiet mode, such as DF=17 or DF=19 extended squitters.

After response engine 520 receives a command from TCAS CU 110 to disable quiet mode, response engine 520 will respond to all interrogations and resume transmission of inhibited unsolicited message formats.

FIG. 6 is a flowchart illustrating a method 600 to send a command to a transponder 120 to enter a quiet mode. First, the flight formation detection engine 360 determines (610) if the aircraft that the TCAS CU 110 is installed in is a member of a formation flight and not a tail or lead member. Engine 360 determines (610) if the aircraft is in a flight formation and not a tail or lead member via flight crew input via input device 230. In an alternative embodiment of the invention, engine 360 determines relative flight position by monitoring RF transmissions from other aircraft in the formation. In another embodiment of the invention, engine 360 determines relative flight position by comparing a flight ID from transponder 120 with a set of predefined flight IDs.

If engine 360 determines (610) that the aircraft is in a formation and not a tail or lead aircraft, the engine 360 sends (620) a command to transponder 120 to enter quiet mode. The engine 360 sends (620) the command by setting a status bit in a periodic ARINC 429 data transmission or via other techniques. If the aircraft is not in a formation or is in a formation but is a tail or lead aircraft, the method 600 loops to determining (610) if the aircraft is in formation and repeats the above process.

Engine 360 then determines (630) if the aircraft is still in a formation and not a tail or lead member based on the techniques described in relation to determining (610). If the aircraft is still in formation, engine 360 loops to determining (630). Otherwise, the method 600 engine 360 sends (640) a command to transponder 120 to disable quiet mode via setting a status bit in an ARINC 429 data transmission or via other techniques. The method 600 then ends.

FIG. 7 is a flowchart illustrating a method 700 for inhibiting a transponder 120 from responding to ATC interrogations when in a quiet mode. First, interrogation monitoring engine 510 receives (710) an interrogation via antenna 160 or 170. Next, engine 520 determines (720) if it is in a quiet mode based on receipt of an enter quiet mode command from TCAS CU 110. If the response engine 520 is not in a quiet mode, then the response engine 520 responds (740) to the interrogation and the method 700 ends.

If the response engine 520 is in a quiet mode, then the response engine 520 determines (730) the format of the interrogation. If the interrogation is an ATC interrogation (e.g., ATCRBS Mode A (e.g., unique identifier) and C (e.g. altitude), Mode S altitude request, or Mode S identity request), the response engine 520 does not respond and the method 700 ends. If the interrogation is not an ATC interrogation (e.g., a Mode S UF=0 or UF=16 interrogation), the response engine 520 responds (740) to the interrogation in any conventional manner; and, method 700 then ends.

Figure 8:
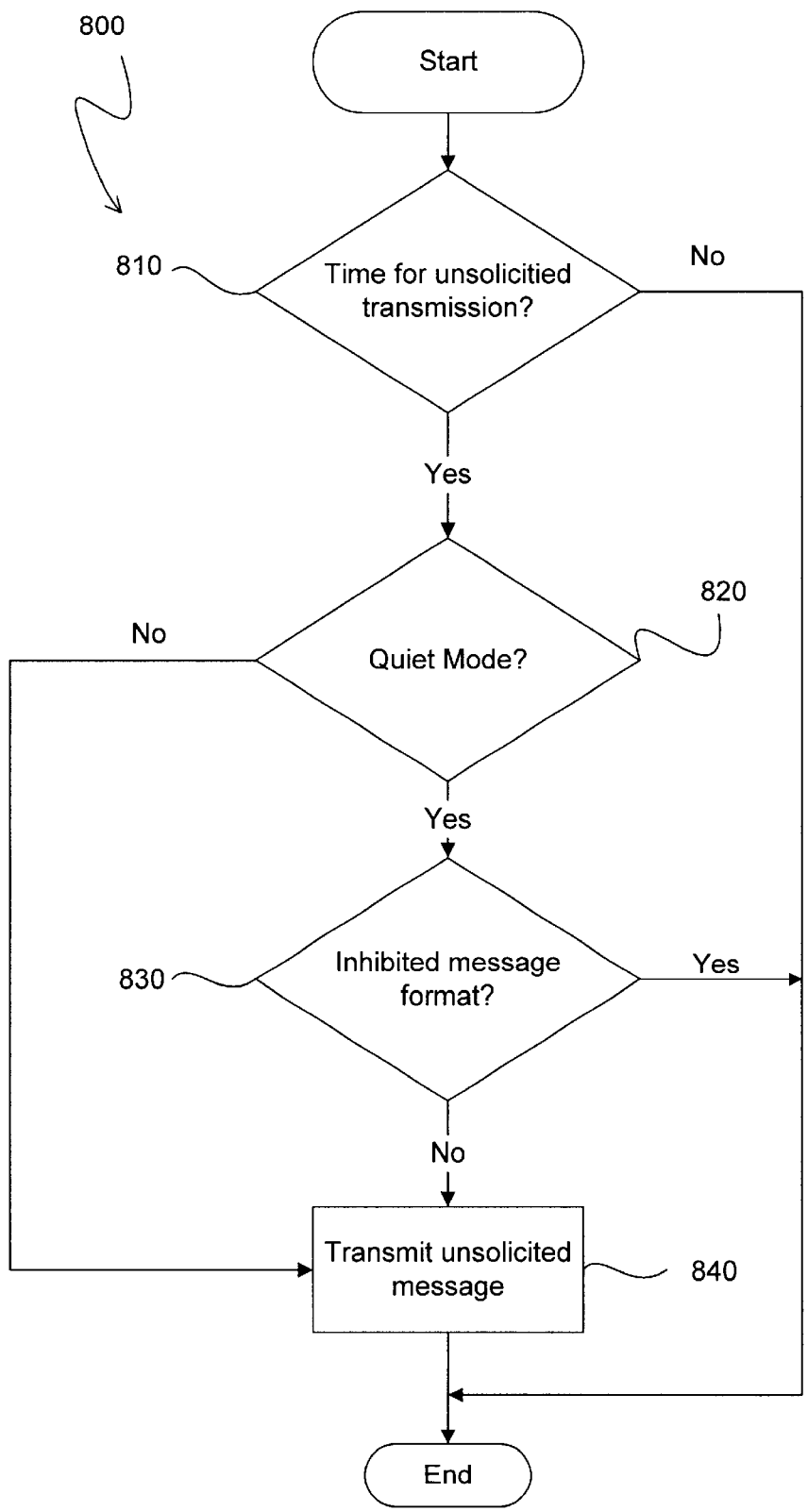
FIG. 8 is a flowchart of a method for inhibiting transmitting in another embodiment according to various aspects of the present invention.

FIG. 8 is a flowchart illustrating a method 800 for inhibiting a transponder 120 from transmitting predetermined unsolicited format replies. In one implementation, response engine 520 maintains a list, each list entry being an association of a particular reply format and a time for transmission. The time may be determined (810) with reference to a timer that is restarted after each time out; or, current time may be evaluated with reference to a threshold, a duration, a schedule of times, or an algorithmic expression to indicate whether lapse of a suitable interval has occurred, signalling that it is time to transmit the particular reply format. For each particular format, the period between times to transmit may be unique and further it may be either regular or pseudorandom. If it is not time for an unsolicited format reply transmission, the method 800 ends. Otherwise, response engine 520 determines (820) if it is in a quiet mode, for example, due to an earlier receipt of an enter quiet mode command from TCAS CU 110.

If not in a quiet mode, the unsolicited reply format transmission is performed and the method 800 ends. Otherwise, response engine 520 determines whether the particular reply format is to be inhibited (830). In one implementation, response engine 520 tests a flag that is associated with the particular reply format; and, if the flag is asserted, concludes that the particular format is to be inhibited.

If the reply format is to be inhibited, transmission (840) is not performed and the method 800 ends. Otherwise, response engine 520 transmits the particular unsolicited reply format (840) and the method 800 ends.

The foregoing description of the embodiments of the present invention is by way of example only, and other variations and modifications of the above-described embodiments and methods are possible in light of the foregoing teaching. For example, engines 300–360 and engines 500–520 may be implemented as integrated circuits, DSPs, ASICs, etc. Functions of a TCAS CU and of a transponder may be combined into one physical assembly (one or more CPUs) or divided in any manner between system physical assemblies (e.g., line replaceable units) with suitable modifications to software for cooperation of the physical assembly or assemblies. In alternate embodiments, colission avoidance according to the present invention is accomplished in cooperation with navigation and situational awareness functions in addition to or in place of the TCAS functions discussed above (e.g., terrain avoidance, windshear avoidance, avoidance of adverse weather conditions, avoiding military threats to the host aircraft, or on-ground colision avoidance). Coupling between physical assemblies may be wired or wireless. The embodiments described herein are not intended to be exhaustive or limiting. The present invention is limited only by the following claims.

What is claimed is:

1. A method performed by a collision avoidance system aboard a host aircraft, the method for limiting transmitting from a transponder of the system, the method comprising:
    a step for determining whether the host aircraft is flying in a formation;
    a step for performing a collision avoidance function, in a mode of operation of a set of modes comprising a normal mode wherein a message having a first message format is transmitted by the transponder in response to at least one of lapse of a period of time and receipt of an interrogation having a second message format, and a quiet mode wherein a message is not transmitted that would have been transmitted if in a normal mode; and
    a step for determining the mode of operation in response to whether the host aircraft is flying in the formation.

2. The method of claim 1 wherein the interrogation comprises at least one of an altitude interrogation and an identifier interrogation.

3. The method of claim 1 wherein the system further comprises computer; and the method further comprises a step for operating the transponder in the quiet mode in accordance with a command received by the transponder from the computer.

4. The method of claim 3 wherein the command is received by the transponder in an ARINC 429 data transmission.

5. The method of claim 1 wherein:
    the step for determining whether the host aircraft is flying in the formation further comprises a step for determining that the host aircraft is not a lead member of the formation, and is not a tail member of the formation; and
    the step for determining the mode of operation further comprises a step for determining the mode of operation as quiet mode in further accordance with whether the host aircraft is not a lead member of the formation, and is not a tail member of the formation.

6. The method of claim 1 wherein a message having a third message format different from the first message format is transmitted by the transponder operating in the quiet mode and in response to at least one of lapse of time associated with the third message format and receipt of an interrogation having a message format different from the second message format.

7. The method of claim 6 wherein the collision avoidance function comprises at least one of a traffic colission avoidance function, a terrain avoidance function, a windshear avoidance function, and a military threat avoidance function.

8. The method of claim 1 wherein the second message format comprises at least one of an ATCRBS Mode A, an ATCRBS Mode C, a Mode S UF=4, a Mode S UF=5, a Mode S UF=11, a Mode S UF=20, and a Mode S UF=21.

9. The method of claim 1 wherein the first message format comprises at least one of a Mode S DF=17 and a Mode S DF=19.

10. A computer-readable storage medium comprising instructions for performing the method of claim 1.

11. A system for collision avoidance in a host aircraft, the system comprising:
    means for determining whether the host aircraft is flying in a formation;
    means for performing a collision avoidance function, in a mode of operation of a set of modes comprising a normal mode wherein a message having a first message format is transmitted by the transponder in response to at least one of lapse of a period of time and receipt of an interrogation having a second message format, and a quiet mode wherein a message is not transmitted that would have been transmitted if in a normal mode; and
    means for determining the mode of operation in response to whether the host aircraft is flying in the formation.

12. The system of claim 11 wherein the interrogation comprises at least one of an altitude interrogation and an identifier interrogation.

13. The system of claim 11 wherein the means for performing comprises a transponder coupled to a computer; wherein the the transponder operates in the quiet mode in accordance with a command received by the transponder from the computer.

14. The system of claim 13 wherein the command is received in an ARINC 429 data transmission.

15. The system of claim 11 wherein:
    the means for determining whether the host aircraft is flying in the formation further comprises means for determining that the host aircraft is not a lead member of the formation, and is not a tail member of the formation; and the means for determining the mode of operation further comprises means for determining the mode of operation as quiet mode in further accordance with whether the host aircraft is not a lead member of the formation, and is not a tail member of the formation.

16. The system of claim 11 wherein a message having a third message format different from the first message format is transmitted by the transponder operating in the quiet mode and in response to at least one of lapse of time associated with the third message format and receipt of an interrogation having a message format different from the second message format.

17. The system of claim 11 wherein the collision avoidance function comprises at least one of a traffic collision avoidance function, a terrain avoidance function, a windshear avoidance function, and a military threat avoidance function.

18. The system of claim 11 wherein the second message format comprises at least one of an ATCRBS Mode A, an ATCRBS Mode C, a Mode S UF=4, a Mode S UF=5, a Mode S UF=11, a Mode S UF=20, and a Mode S UF=21.

19. The system of claim 11 wherein the first message format comprises at least one of a Mode S UF=17 and a Mode S UF=19.

20. A method performed by a collision avoidance system aboard a host aircraft, the method for limiting transmitting from a transponder of the system, the method comprising:
determining whether the host aircraft is flying in a formation;
performing a collision avoidance function, in a mode of operation of a set of modes comprising a normal mode wherein a message having a first message format is transmitted by the transponder in response to at least one of lapse of a period of time and receipt of an interrogation having a second message format, and a quiet mode wherein a message is not transmitted that would have been transmitted if in a normal mode; and
determining the mode of operation in response to whether the host aircraft is flying in the formation.

21. The method of claim 20 wherein the interrogation comprises at least one of an altitude interrogation and an identifier interrogation.

22. The method of claim 20 wherein the system further comprises a computer; and the method further comprises a step for operating the transponder in the quiet mode in accordance with a command received by the transponder from the computer.

23. The method of claim 22 wherein the command is received by the transponder in an ARINC 429 data transmission.

24. The method of claim 20 wherein:
the step for determining whether the host aircraft is flying in the formation further comprises a step for determining that the host aircraft is not a lead member of the formation, and is not a tail member of the formation; and
the step for determining the mode of operation further comprises a step for determining the mode of operation as quiet mode in further accordance with whether the host aircraft is not a lead member of the formation, and is not a tail member of the formation.

25. The method of claim 20 wherein a message having a third message format different from the first message format is transmitted by the transponder operating in the quiet mode and in response to at least one of lapse of time associated with the third message format and receipt of an interrogation having a message format different from the second message format.

26. The method of claim 25 wherein the collision avoidance function comprises at least one of a traffic collision avoidance function, a terrain avoidance function, a windshear avoidance function, and a military threat avoidance function.

27. The system of claim 20 wherein the second message format comprises at least one of an ATCRBS Mode A, an ATCRBS Mode C, a Mode S UF=4, a Mode S UF=5, a Mode S UF=11, a Mode S UF=20, and a Mode S UF=21.

28. The method of claim 20 wherein the first message format comprises at least one of a Mode S DF=17 and a Mode S DF=19.

29. A computer-readable storage medium comprising instructions for performing the method of claim 20.

30. A system for collision avoidance in a host aircraft, the system comprising:
a computer that determines whether the host aircraft is flying in a formation;
a transponder that cooperates with the computer to perform a collision avoidance function, in a mode of operation of a set of modes comprising a normal mode wherein a message having a first message format is transmitted in response to at least one of lapse of a period of time and receipt of an interrogation having a second message format, and a quiet mode wherein a message is not transmitted that would have been transmitted if in a normal mode; wherein
the computer further determines the mode of operation in response to whether the host aircraft is flying in the formation.

31. The system of claim 30 wherein the interrogation comprises at least one of an altitude interrogation and an identifier interrogation.

32. The system of claim 31 wherein the transponder operates in the quiet mode in accordance with a command received by the transponder from the computer.

33. The system of claim 32 wherein the command is received in an ARINC 429 data transmission.

34. The system of claim 30 wherein:
the computer determines whether the host aircraft is flying in the formation in accordance with determining that the host aircraft is not a lead member of the formation, and is not a tail member of the formation; and
the computer determines the mode of operation in accordance with determining the mode of operation as quiet mode in further accordance with whether the host aircraft is not a lead member of the formation, and is not a tail member of the formation.

35. The system of claim 30 wherein a message having a third message format different from the first message format is transmitted by the transponder operating in the quiet mode and in response to at least one of lapse of time associated with the third message format and receipt of an interrogation having a message format different from the second message format.

36. The system of claim 30 wherein the collision avoidance function comprises at least one of a traffic collision avoidance function, a terrain avoidance function, a windshear avoidance function, and a military threat avoidance function.

37. The system of claim 30 wherein the second message format comprises at least one of an ATCRBS Mode A, an ATCRBS Mode C, a Mode S UF=4, a Mode S UF=5, a Mode S UF=11, a Mode S UF=20, and a Mode S UF=21.

38. The system of claim 30 wherein the first message format comprises at least one of a Mode S UF=17 and a Mode S UF=19.

* * * * *